United States Patent
Wang

(10) Patent No.: US 11,347,213 B2
(45) Date of Patent: May 31, 2022

(54) DEEP-LEARNING-BASED FAULT DETECTION IN BUILDING AUTOMATION SYSTEMS

(71) Applicant: Siemens Industry, Inc., Alpharetta, GA (US)

(72) Inventor: Qinpeng Wang, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 82 days.

(21) Appl. No.: 16/015,344

(22) Filed: Jun. 22, 2018

(65) Prior Publication Data

US 2019/0391573 A1    Dec. 26, 2019

(51) Int. Cl.
| G05B 23/02 | (2006.01) |
| G05B 13/02 | (2006.01) |
| F24F 11/38 | (2018.01) |
| F24F 3/044 | (2006.01) |

(52) U.S. Cl.
CPC ....... *G05B 23/0254* (2013.01); *G05B 13/027* (2013.01); *F24F 3/044* (2013.01); *F24F 11/38* (2018.01)

(58) Field of Classification Search
None
See application file for complete search history.

(56) References Cited

U.S. PATENT DOCUMENTS

| 7,620,523 | B2 * | 11/2009 | Marvasti | ............ | G05B 23/0221 |
| | | | | | 340/679 |
| 7,739,096 | B2 * | 6/2010 | Wegerich | ............... | G05B 17/02 |
| | | | | | 702/183 |
| 2008/0243383 | A1 * | 10/2008 | Lin | ....... | G01C 21/165 |
| | | | | | 342/357.53 |
| 2009/0299654 | A1 * | 12/2009 | Garvey | ........ | E21B 47/00 |
| | | | | | 702/183 |
| 2012/0185728 | A1 * | 7/2012 | Guo | .......... | G06K 9/6256 |
| | | | | | 714/26 |
| 2017/0076217 | A1 * | 3/2017 | Krumm | ........ | G06N 7/005 |
| 2018/0024520 | A1 | 1/2018 | Sinha et al. | | |
| 2018/0046149 | A1 | 2/2018 | Ahmed | | |

(Continued)

FOREIGN PATENT DOCUMENTS

| WO | 2017/034512 A1 | 3/2017 |
| WO | 2018/004580 A1 | 1/2018 |

OTHER PUBLICATIONS

Srivastava, N. et al., "Dropout: A Simple Way to Prevent Neural Networks from Overfitting", Journal of Machine Learning Research, vol. 15, Jun. 2014, 30 pages.

(Continued)

*Primary Examiner* — Jason Lin

(57) ABSTRACT

Methods, mediums, and systems include use of a system manger application in a data processing system for fault detection a building automation system using deep learning, to receive point data for a hardware being analyzed, where the received point data is contaminated data, train a deep learning model for the hardware being analyzed, generate predicted data based on the deep learning model, analyze the predicted data and the received point data, identify a fault in the hardware being analyzed according to the received point data and the predicted data, and produce a fault report according to the identified fault.

16 Claims, 6 Drawing Sheets

(56) References Cited

U.S. PATENT DOCUMENTS

| | | | | |
|---|---|---|---|---|
| 2018/0137389 A1* | 5/2018 | Mathieu | ............... | G06N 3/0445 |
| 2018/0165554 A1* | 6/2018 | Zhang | .................... | G06N 7/005 |
| 2018/0284735 A1* | 10/2018 | Celia | .................... | G05B 23/024 |
| 2018/0373234 A1* | 12/2018 | Khalate | .................. | G06N 7/005 |
| 2019/0034830 A1* | 1/2019 | Burangulov | ........... | G06N 20/00 |
| 2019/0172564 A1* | 6/2019 | Chandra | ................ | G06N 20/00 |
| 2019/0213446 A1* | 7/2019 | Tsou | .................... | G06K 9/6257 |

OTHER PUBLICATIONS

Yin Zuyu et al.: "Introduction of SVM Algorithms and Recent Applications About Fault Diagnosis and Other Aspects", 2015 IEEE 13th International Conference on Industrial Informatics (INDIN), Jul. 22, 2015, XP033218832, 6 pages.

PCT Search Report dated Sep. 12, 2019, for PCT Application No. PCT/US2019/035184, 15 pages.

\* cited by examiner

DEEP-LEARNING-BASED FAULT DETECTION IN BUILDING AUTOMATION SYSTEMS

TECHNICAL FIELD

The present disclosure is directed, in general, to automation systems and, more particularly, to systems and methods employing machine-learning techniques for fault detection and diagnosis (FDD) of building automation systems (BASs).

BACKGROUND OF THE DISCLOSURE

Building automation systems encompass a wide variety of systems that aid in the monitoring and control of building operations. Building automation systems include security systems, fire safety systems, and comfort systems that control environmental parameters such as heating, ventilation, and air conditioning ("HVAC") and lighting. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operations may be controlled.

To allow for monitoring and control of the dispersed control system elements, building automation systems often employ multi-level communication networks to communicate operational and/or alarm information between operating elements, such as sensors and actuators, and the centralized control station. Several control stations connected via an Ethernet or another type of network may be distributed throughout one or more building locations, each having the ability to monitor and control system operations.

An important function of a management system for building automation devices involves detecting faults and other error or abnormal conditions in the system. Rules-based systems incorporate fundamental principles of building operation, the experience of building experts, and establish specific expected ranges of performance for building systems. However, this approach has its drawbacks, such as hard to scale, and vague diagnostic information. For example, FDD in a BAS typically requires rules to be predefined and manually configured with data collected from points in the BAS. The more complex the rule, the more configuration of the rule is required. Furthermore, the more complex the rule, the greater the chance to errors being made in the implementation of it. Improved systems and methods are desirable.

SUMMARY OF THE DISCLOSURE

Various disclosed embodiments include methods, mediums, and systems for fault detection of a building automation system using deep learning. A building automation system can receive point data for a hardware being analyzed, where the received point data is contaminated data (that is, data that is not known to be free of faults), train a deep learning model for the hardware being analyzed, generate predicted data based on the deep learning model, analyze the predicted data and the received point data, identify a fault in the hardware being analyzed according to the received point data and the predicted data, and produce a fault report according to the identified fault.

Another embodiment includes a non-transitory computer-readable medium encoded with executable instructions that is configured to run in a data processing system of a management system, configured to perform functions and perform processes as described herein. Another embodiment includes a building automation system including a data processing system, and a plurality of devices, sensors, and actuators, where the data processing system executes a system manager application to perform functions and to perform processes as described herein.

In various embodiments, the received data includes at least required points for the hardware being analyzed. In various embodiments, training the deep learning model includes applying a Huber loss function. In various embodiments, training the deep learning model includes applying dropout techniques for regularization to the received point data. In various embodiments, analyzing the predicted data and the received point data includes include applying cumulative sum control chart (CUSUM) sequential analysis for summing, weighting, and change detection. In various embodiments, the system manager application also normalizes some or all of the data, such as normalizing the deviation between the predicted data and the received point data or normalizing some or all of the predicted data or the received point data. In various embodiments, identifying the fault includes comparing the received point data for a first period of time with the predicted data for a corresponding second period of time. In various embodiments, identifying the fault includes identifying when the normalized deviation between received point data and the predicted data is greater than a predetermined threshold. In various embodiments, the fault report is a graphic user interface illustrating the received point data as compared to the predicted data.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conceptions and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Rules-based fault detection is limited in its ability to scale to large systems, where each rule must be defined for each potential fault, and in providing specific feedback as to faults.

Machine learning is a subfield of artificial intelligence, leveraging self-learning algorithms to gain knowledge from data, which eventually helps decision makers arrive at more informed decisions. Machine learning offers a more efficient way of capturing knowledge from data and making predictions, as it relieves humans from deriving rules and building models manually from empirical analysis of data. Applying machine learning to the field of building science, disclosed embodiments can mine inherent relationships between several trended points, make predictions, investigate any deviation of actual measurements from predictions, and identify faulty data. Deep learning is a type of machine learning that applies artificial intelligence techniques in processing data and creating patterns for use in decision making. Deep learning can use networks capable of learning unsupervised from data that is unstructured or unlabeled.

Some machine learning approaches involve a two-step process. First, the system must be trained using a statistical model from normal operation with fault-free data. Then, the system can make predictions with this model against operational data during the analysis period to look for a potential fault. Such an approach has several drawbacks. For example, fault free data is difficult or impossible to obtain in real world projects. Further, the two-step process is cumbersome. Moreover, if the system is faced with operational conditions not covered by the fault free training data, false alarm problems in the fault detection phase will be very likely.

Disclosed embodiments include systems and methods in which all data during the analysis period, which in any real-world case is potentially faulty, is trained with a deep machine learning model. A daily metric can be computed and analyzed to detect a fault or other anomaly, since on a "faulty" day, this metric will be considerably larger than on a normal day. Such an approach combines the two steps in one, and addresses all drawbacks mentioned above. In specific implementations, a graphics processing unit (GPU) can be used to perform particular functions to improve performance.

Figure 1:
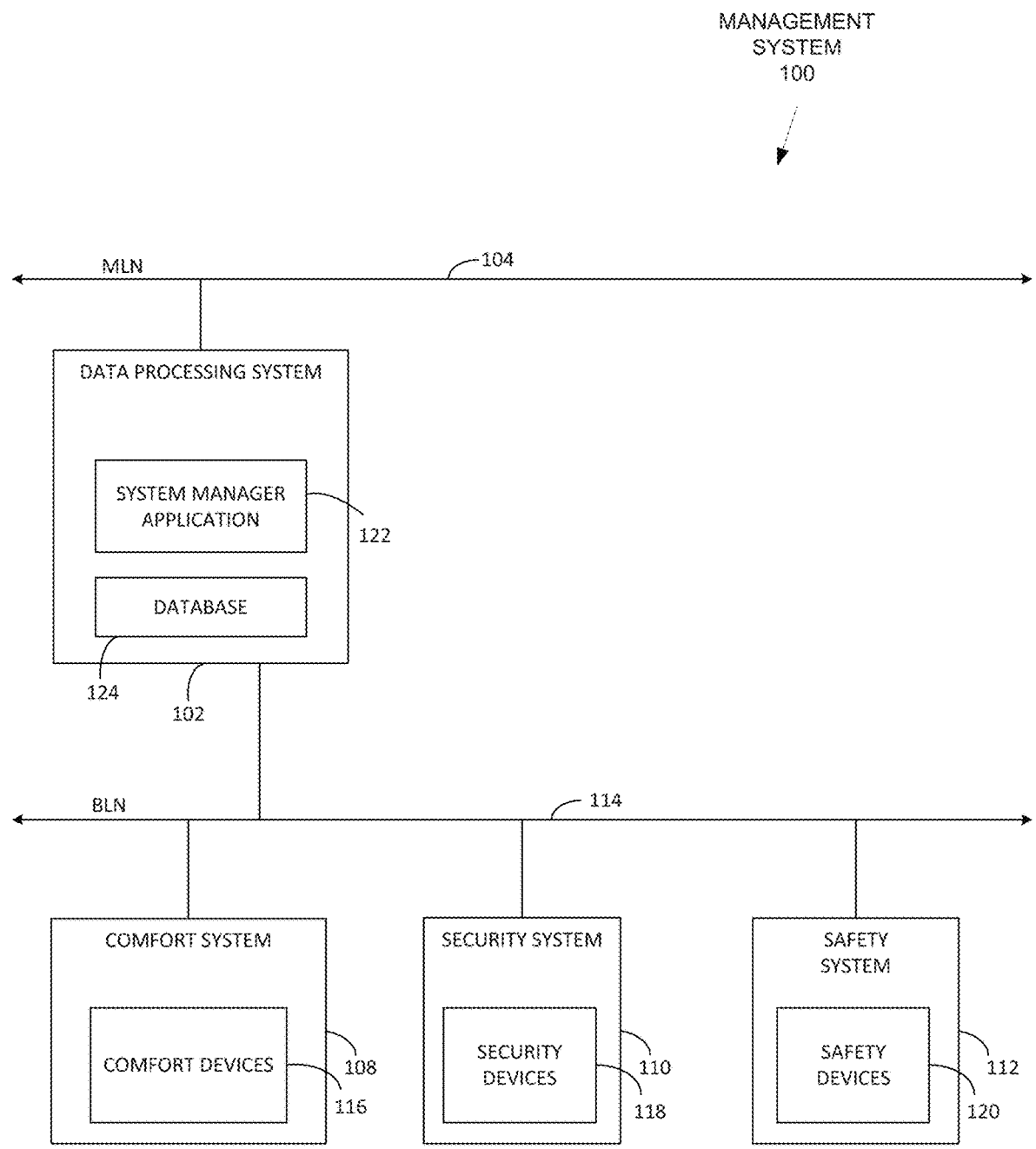
FIG. 1 illustrates a block diagram of a management system in accordance with disclosed embodiments.

FIG. 1 illustrates a block diagram of management system 100 in which various embodiments of the present disclosure are implemented. In this illustrative embodiment, the management system 100 includes a data processing system 102 connected, via a management level network (MLN) 104 to various other data processing systems and other devices in the management system 100. MLN 104 may include any number of suitable connections, such as wired, wireless, or fiber optic links. MLN 104 may be implemented as a number of different types of networks, such as, for example, the Internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, data processing system 102 is operably connected to comfort system 108, security system 110, and safety system 112 via building level network (BLN) 114. The comfort system 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the comfort system 108 includes comfort devices 116, the security system 110 includes security devices 118, and the safety system 112 includes safety devices 120. The devices 116-120 may be located inside or in proximity to one or more buildings under the control of the management system 100. The devices 116-120 are configured to provide, monitor, and/or control functions of the comfort system 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the comfort system 108, the security system 110, the safety system 112, and/or the data processing system 102. Field devices (such as sensors, actuators, cameras, light devices, heaters, chillers and other HVAC, security and fire safety devices may be connected via a field level network to a field panel or field controller for monitoring and controlling the respective field devices within a room, floor or other space of a building.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on a data processing system 102. In some embodiments, system manager application 122 may be an application framework as described in PCT Application Serial No. PCT/US2011/054141, entitled "Management System with Versatile Display" and U.S. Provisional Patent Application Ser. No. 61/541,925, entitled "Management System Using Function Abstraction for Output Generation," both hereby incorporated by reference. The system manager application 122 is a collection of software and associated data files. The system manager application 122 may include, for example, without limitation, executable files, user layout definition files, rules files, graphics control modules, an infrastructure interface, and/or a number of software extensions. The system manager application 122 provides a user-modifiable and intuitive graphical user interface for allowing a user to monitor, review, and control various building automation system devices. The system manager application 122 provides a user-modifiable and intuitive graphical user interface for interacting with a user using trend views as described herein.

The data processing system 102 includes a database 124 that stores information about the devices 116-120 within the management system 100. A database 124 includes one or more data models of data points, devices, and other objects monitored and controlled by the management system 100. For example, the database 124 may store values for devices in the comfort system 108 (e.g., temperature, alarm status, humidity). These values may each be referred to as a point or data point. The database 124 may also store static information, such as, model numbers, device types, and/or building and room installation location information about devices in the management system 100. The database 124 may also store graphical models of one or more buildings managed by the management system 100. For example, the graphical models may include layouts and schematics of one or more rooms, floors, and buildings managed by the management system 100.

In these illustrative embodiments, objects associated with the management system 100 include anything that creates, processes, or stores information regarding data points, such as physical devices (controllers, field panels, sensors, actuators, cameras, etc.) and maintains data files, such as control schedules, trend reports, defined system hierarchies, and the like.

The system manager application 122 may further include software extensions or services that provide operations of the management system 100. For example, the software extensions may include a print manager, a reporting subsystem, and a status propagation manager. For example, a reporting subsystem implemented on a workstation data processing system 102 is a system that manages the acquisition of data values from the database 124 used in the generation of reports as well as comparative trend views.

The data processing system 102 is connected to the BLN 114 and includes one or more hardware and/or software interfaces for sending and receiving information to and from the devices 116-120 in the comfort system 108, the security system 110, and/or the safety system 112. For example, the data processing system 102 may request and receive data regarding a status of one or more devices in the devices 116-120. The system manager application 122, via data processing system 102, also provides a user with the functionality to monitor real-time information about the status of one or more devices and objects associated with the management system 100. The client manager application 122, via server data processing system 102 or client data processing system 106, also provides a user with the functionality to issue commands to control one or more devices and objects associated with the management system 100. For example, one or more of the devices 116-120 may operate on a network protocol for exchanging information with the management system, such as BACnet or LonTalk.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, the building automation systems controlled by the management system 100 may not include one or more of the comfort system 108, the security system 110, and/or the safety system 112.

Figure 2:
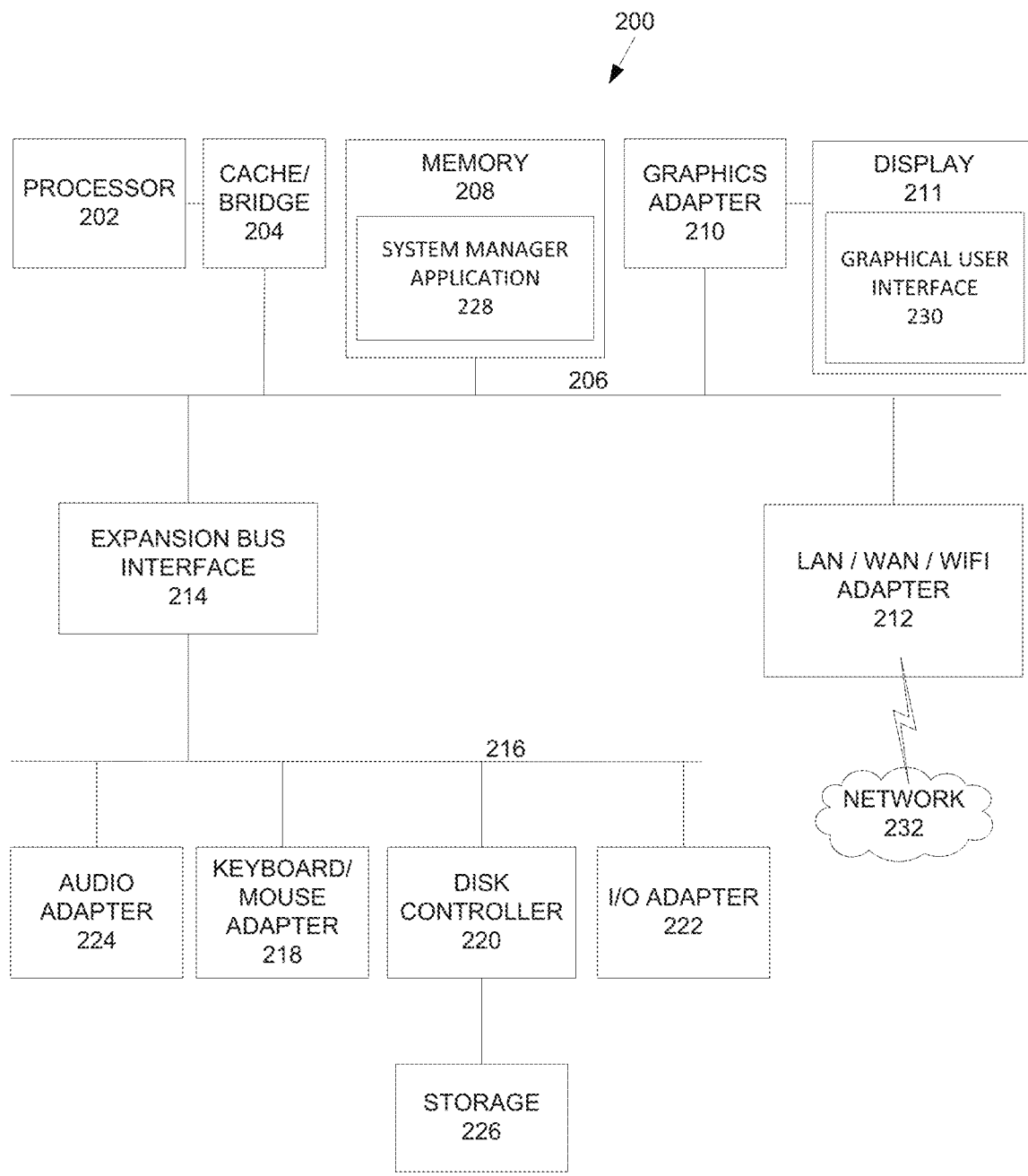
FIG. 2 illustrates a block diagram of a data processing system that may be employed in the management system in FIG. 1 in accordance with disclosed embodiments.

FIG. 2 depicts a block diagram of a data processing system 200 in which various embodiments are implemented. The data processing system 200 is an example of one implementation of the server data processing system 102 in FIG. 1.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as a workstation with all or portions of a system manager application 122 installed in the memory 208 as a system manager application 228. The system manager application 228 is an example of one embodiment of system manager application 122 in FIG. 1. For example, the processor 202 executes program code of the system manager application 228 to generate graphical interface 230 displayed on display 211. In various embodiments of the present disclosure, the graphical user interface 230 provides an interface for a user to view information about and control one or more devices, objects, and/or points associated with the management system 100. The graphical user interface 230 also provides an interface that is customizable to present the information and the controls in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement discovery of objects and generation of hierarchies for the discovered objects.

The LAN/WAN/Wifi adapter 212 may be connected to a network 232, such as, for example, MLN 104 in FIG. 1. As further explained below, the network 232 may be any public or private data processing system network or combination of networks known to those of skill in the art, including the Internet. Data processing system 200 may communicate over network 232 to one or more computers, which are also not part of the data processing system 200, but may be implemented, for example, as a separate data processing system 200.

In various embodiments, system manager application 122 may, via data processing system 102, generate reports of both current trends of values as well as historical trends of values generated within the devices monitored by the management system 100 and display graphical representations of such trends of values on a graphical user interface 230. Further, system manager application 122 may, via data processing system 102, display an analysis of trend data and other data, including an identification of any anomalies, faults, or other issues as described herein. In addition, in various embodiments, system manager application 122 may, via data processing system 102, automatically generate graphs, tables, charts, or graphic simulations of historical system data in accordance with the embodiments disclosed herein. Simulations can include a graphical representation of appropriate system devices with labels, colors, or other indicators to represent the data being replayed.

Figure 3:
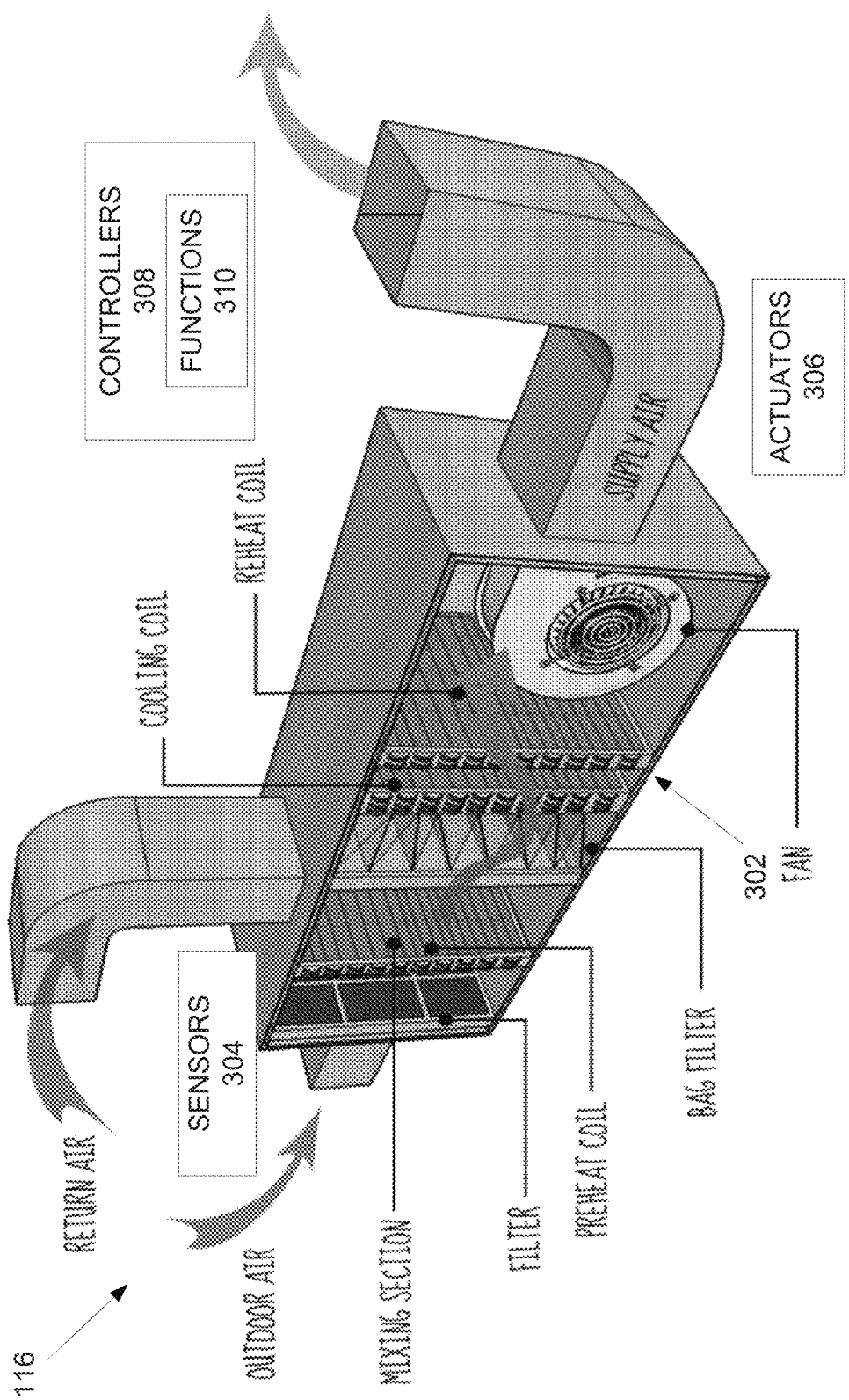
FIG. 3 illustrates an example of a comfort device in accordance with disclosed embodiments.

FIG. 3 illustrates an example of a comfort device 116 in accordance with disclosed embodiments, in this example an air handling unit 302. Each comfort device 116, or other device described above in the management system, can have one or more sensors 304, actuators 306, or controllers 308. Each controller 308 can have one or more associated functions 310 that control, monitor, or otherwise interact with the sensors 304 and actuators 306. Sensors 304 can include any sensors used in the corresponding device, such as thermometers, pressure sensors, airflow sensors, safety sensors such as fire or smoke detectors, motion sensors, heat sensors, or otherwise. Actuators 306 can include any controllable device, such as solenoids, switches, motors, etc. The controller 308 can communicate with data processing system 102, and in some embodiments, data processing system 102 directly acts as the control 308. This particular, non-limiting example of an air handling unit 302 illustrates elements such as the return air, outdoor air, mixing section, filter, preheat coil, bag filter, cooling coil, reheat coil, fan, and supply air.

In particular, data can be stored for each of the sensors 304, actuators 306, controllers 308, or functions 310 that indicate the state, operation, or readings of each of these components, and this data can be stored in database 124 or another storage. This data can include a plurality of data points for each of these elements. This data is used by functions 310, controller 308, and data processing system 102 to operate and monitor the management system, including performing FDD processes as disclosed herein. Of course, these particular sensors, actuators, controllers, and functions are for purposes of illustration, but each of the particular process implementations can use data from its own sensors, actuators, controllers, or functions, as described below.

A noted above, systems and methods as disclosed herein leverages state-of-the-art "deep learning" libraries. Deep learning is a particular kind of machine learning that achieves great power and flexibility by learning to represent the world as a nested hierarchy of concepts. In other words, it allows computers to learn complicated concepts by building them out of simpler ones.

Various embodiments can be implemented using GPU computing for performance. For example, to analyze years of building automation data, computational time could become a performance bottleneck. A computer system graphics card as can be viewed as a small computer cluster inside the machine that uses the GPU(s) for computationally-intensive tasks. A GPU is relatively cheap compared to state-of-the-art CPUs. For example, the current market at 70% of the price of a modern CPU, a GPU can be obtained that has 450× more cores and is capable of 15× more floating-point calculations per second. In processes as disclosed herein, GPU computing can be 10× faster than CPU computing.

Further, contrary to other approaches, the intelligent processes disclosed herein avoid the requirement of trend data free of faults by using robust estimation techniques. Traditional machine learning based FDD requires trend data to be free of faults; otherwise the fault detection power will be greatly undermined, and so requires a two-step process of training and detection. The disclosed estimation techniques simplify the workflow while not strictly requiring received point data to be free of faults.

Processes as described herein are more scalable and adaptable over time with changes in building operation, as compared to other approaches. They are more suitable for catching early faults or degradation faults and provide more actionable fault diagnostic information down to sub-system level. For instance, in a building automation implementation, a system as described herein can clearly indicate faults associated with sub-systems inside an air handling unit (AHU), such as the mixing box or the cooling coil system.

The description below includes several implementation examples for use in building automation systems, including a mixing box FDD, a fan FDD, a heating coil FDD, a cooling coil FDD, and a site energy FDD, but the techniques disclosed herein are not limited to these examples. The first four examples detect and diagnose whether a specific air handling unit (AHU) is subject to faults associated with these subsystems, while the site energy example discovers abnormal energy consumption at the site level.

For a specific implementation, the specific points may differ. As described below, the system can receive, from a user, a selection of an FDD analysis to perform, and in response, display to the user the point used for that example. Examples of point function requirement levels are explained in the following table, but these examples are non-limiting to the overall processes described herein:

TABLE 1

| Requirement Level | Explanation |
| --- | --- |
| Preferred Point | Process prefers this point, or instead would require some other points in its place. |
| Alternative Point | If preferred point is not available, these points can take its place. |
| Required Point | Process requires this point to run |
| Optional Point | Process can run without this point, but would be more accurate with this point. |

Each of the exemplary implementations can use its own set or required points. For example, a mixing box FDD implementation can have the following required points:
Supply Airflow
Outdoor Air Damper Command
Outdoor Airflow
Outdoor Air Temperature
Mix Air Temperature
Return Air Temperature In a mixing box FDD implementation, the system detects faults such as stuck/leaky damper, by studying the relationship between outdoor airflow and supply airflow, given a certain OA damper command.

As another example, a fan FDD implementation can have the following required points:
Supply Airflow
Supply Fan Power
Supply Fan VFD Speed Command In a fan FDD implementation, the system detects fan belt slipping faults by studying the relationship between fan power and supply airflow, given a certain fan speed command.

As another example, a heating coil FDD implementation can have the following required points:
Supply Airflow
Supply Air Temperature
Supply Air Temperature Setpoint
Mix Air Temperature
Cooling Coil Valve Command
Heating Coil Valve Command
Boiler Hot Water Supply Temperature
Boiler Hot Water Supply Temperature Setpoint
Hot Water Loop Differential Pressure
Hot Water Loop Differential Pressure Setpoint In a heating coil FDD implementation, the system detects faults such as deteriorated coil and stuck/leaky valve by studying the coil inlet and outlet condition, given a certain supply airflow.

As another example, a cooling coil FDD implementation can have the following required points:
Supply Airflow
Supply Air Temperature
Supply Air Temperature Setpoint
Cooling Coil Valve Command
Heating Coil Valve Command
Outdoor Air Temperature
Mix Air Temperature
Return Air Temperature
Outdoor Air Relative Humidity
Return Air Relative Humidity
Chiller Leaving CHW Temperature
Chiller Leaving CHW Temperature Setpoint
CHW Loop Differential Pressure
CHW Loop Differential Pressure Setpoint In a cooling coil FDD implementation, the system detects faults such as deteriorated coil and stuck/leaky valve, by studying the coil inlet and outlet condition, given a certain supply airflow.

As another example, a site energy FDD implementation can have the following required points:
Outdoor Air Temperature
Site Total Power In a site energy FDD implementation, the system detects non-standard site energy consumption.

To build an initial model, the system can load a set of data to be processed, such as data from each of the required points and/or the preferred points, alternate points, or optional points. In one exemplary implementation, this can include loading a "trend interval report" for an APOGEE® Insight building automation system from Siemens Building Technologies, Inc. (Buffalo Grove, Ill.) that includes data according to the point for that particular process as described above. The system can further interact with a user to map available point from the data file to those required by the disclosed processes.

After or while performing processes as described herein, the system can display the progress of the current machine learning process and any previous analysis results. A diagnostics display can include messages such as a warning of too many missing data and data quality issue with sensors. A fault summary display can include core findings of the machine learning-based FDD process. For each detected fault, it can include the dates and times on which the fault occurred. It can display a comparison between predicted values and actual measurements, so the user can see that on identified faulty days, deviation between actual and predicted values is larger than on normal days. It can also display all related point functions associated with this process, enabling the user to zoom in and examine in greater detail. The system can also export all results into a document or to another system for review or further analysis.

Figure 4:
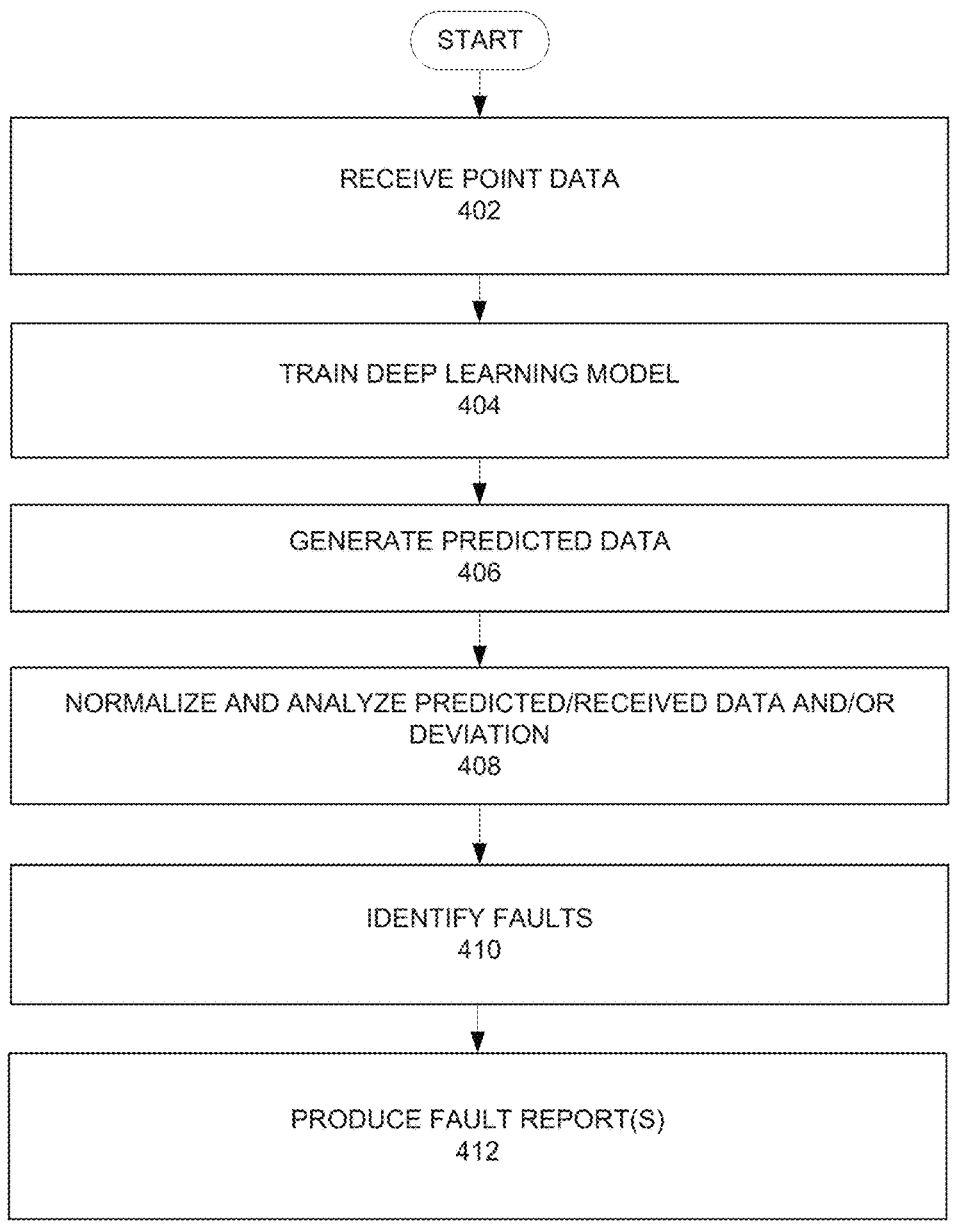
FIG. 4 illustrates depicts a flowchart of a process performed in the management system in accordance with disclosed embodiments.

FIG. 4 depicts a flowchart of an exemplary set of operations that may be executed by a management system to perform fault detection using deep learning techniques as described herein. The process may be implemented by executable instructions stored in a non-transitory computer-readable medium that cause one or more data processing systems to perform such a process. For example, the system manager application 122 that is maintained in a data processing system of a management system may comprise the executable instructions to cause one or more data processing systems to perform such a process. For ease of reference, these are generically referred to as the "system" below, and the system can, for example, run the system manager application to perform the processes described below.

The system receives point data for a hardware being analyzed (402). The point data can be historical data and in particular can be "contaminated" data. "Contaminated" data, as used herein, refers to data that has not been cleaned and may include fault data (that is, data that already reflects a fault condition) or errors, which provides an immediate advantage over systems that require only "clean" data that has been verified to be fault- and error-free. The point data includes at least required points as described herein, and can include alternative points, preferred points, or optional points as described herein, or can be other points as may be appropriate for the particular implementation. When the received point data does not expressly identify the points as described herein, the system can also receive mapping information for mapping the received point data to the required points and/or other points. The hardware being analyzed can be any device or system being analyzed, including in particular building automation elements, components, subsystems, or systems, such as the mixing box, fan, heating coil, and cooling coil subsystem examples described above, or the site energy analysis for the overall site building automation system described above. The point data can reflect the data for the hardware being analyzed over a predetermined first period of time, for example during a typical business day, a week, or a month.

The system trains a deep learning model for the hardware being analyzed (404). In particular, for training the model, the system can apply a Huber loss function to the deep learning model and can apply dropout techniques for regularization to the deep learning model. These techniques are known to those of skill in the art, although not in the context of the processes described herein. The Huber loss function describes the penalty incurred by specific estimation procedures and is used in robust regression since it is less sensitive to outliers in data. The Huber loss function can be used in a process as described herein for guiding the model training process based on stochastic gradient descent. A dropout technique is useful for addressing the problem of overfitting in deep neural networks, and is described, for example, in *Dropout: A Simple Way to Prevent Neural Networks from Overfitting* by Srivastava, et al., Journal of Machine Learning Research 15 (2014) 1929-1958, hereby incorporated by reference. Using these techniques help enable the system to generate an accurate deep learning model even with contaminated received data, by compensating for flaws or errors reflected in the data.

The system generates predicted data based on the deep learning model (406). After building the model as described above, the system generates predicted data for one or more of the points described herein. The predicted data can be generated for a predetermined second period of time, for example for a typical business day, a week, or a month.

The system normalizes and analyzes the predicted data and/or the received data (408). This process can include normalizing some or all of the data to ensure that any comparisons are valid, such as normalizing the deviation between the predicted data and the received point data or normalizing some or all of the predicted data or the received point data. This process can also include applying the cumulative sum control chart (CUSUM) sequential analysis to the data for summing, weighting, and change detection. CUSUM techniques are known to those of skill in the art, although not in the context of the processes described herein. An effect of applying CUSUM techniques is that any faults or abnormal point data is more evident.

The system identifies faults in the hardware being analyzed according to the received point data and the predicted data (410). This can include comparing the received point data for the first period of time with the predicted data for the corresponding second period of time. This can include where the first period of time, for the received point data, is the same as the second period of time, for the predicted data, such as span of specific hours, a given business (occupied) day, weekend (or unoccupied) day, a week, a month, or otherwise.

Identifying the faults can include identifying differences between the received point data and the second point data (for example, for corresponding points and/or times) to determine if the difference is greater than a threshold difference or can use the normalized deviation to detect fault. When the difference is greater than a predetermined threshold difference, then the system can identify a fault. Similarly, when the normalized deviation between received point data and the predicted data is greater than a predetermined threshold, the system can identify a fault. As an example, the actual, received temperature point may be significantly higher or lower than the predicted temperature point, and a fault is determined if the difference exceeds a threshold. As another example, the actual, received airflow point in a mix box may be significantly higher or lower than the predicted airflow point, and a fault is determined if the difference exceeds a threshold.

In other cases, the system can apply more sophisticated rules to determine a fault, similar to rules-based approaches and not required in deep-learning implementations. For example, to determine a fault corresponding to a fouled cooling coil, the system could determine IF cooling valve is at 100%, AND supply air temperature is above set point and the predicted supply air temperature by more than a threshold, THEN identify a fault. As another example to determine a fault corresponding to a fouled cooling coil, the system can determine the cooling system normal behavior (predicted data) as $\Delta T$ in relation to valve position, chilled water temperature, and supply air flow, then the system can identify anomalies, such as the valve opening more to achieve same $\Delta T$ (or, correspondingly, that the $\Delta T$ is missed by more than a threshold at the same valve position, chilled water temperature, and supply air flow).

The system produces a fault report (or reports) according to the identified fault(s) (512). This can include generating a GUI as described herein that identifies the faults, and can include creating and storing, printing, or transmitting such a report. The fault report can represent both the effect of fault severity and the duration of the fault.

Note in particular that the process described above does not require separate processes to first develop the model using "clean" data, and then a separate process to analyze real, contaminated data to detect any faults. Instead, this disclosed process can develop a model directly from the contaminated, actual data, then detect the faults within that very data, in one integrated process. This provides a significant and specific improvement in the building automation system by providing much more robust and efficient fault-detection capabilities.

Figure 5:
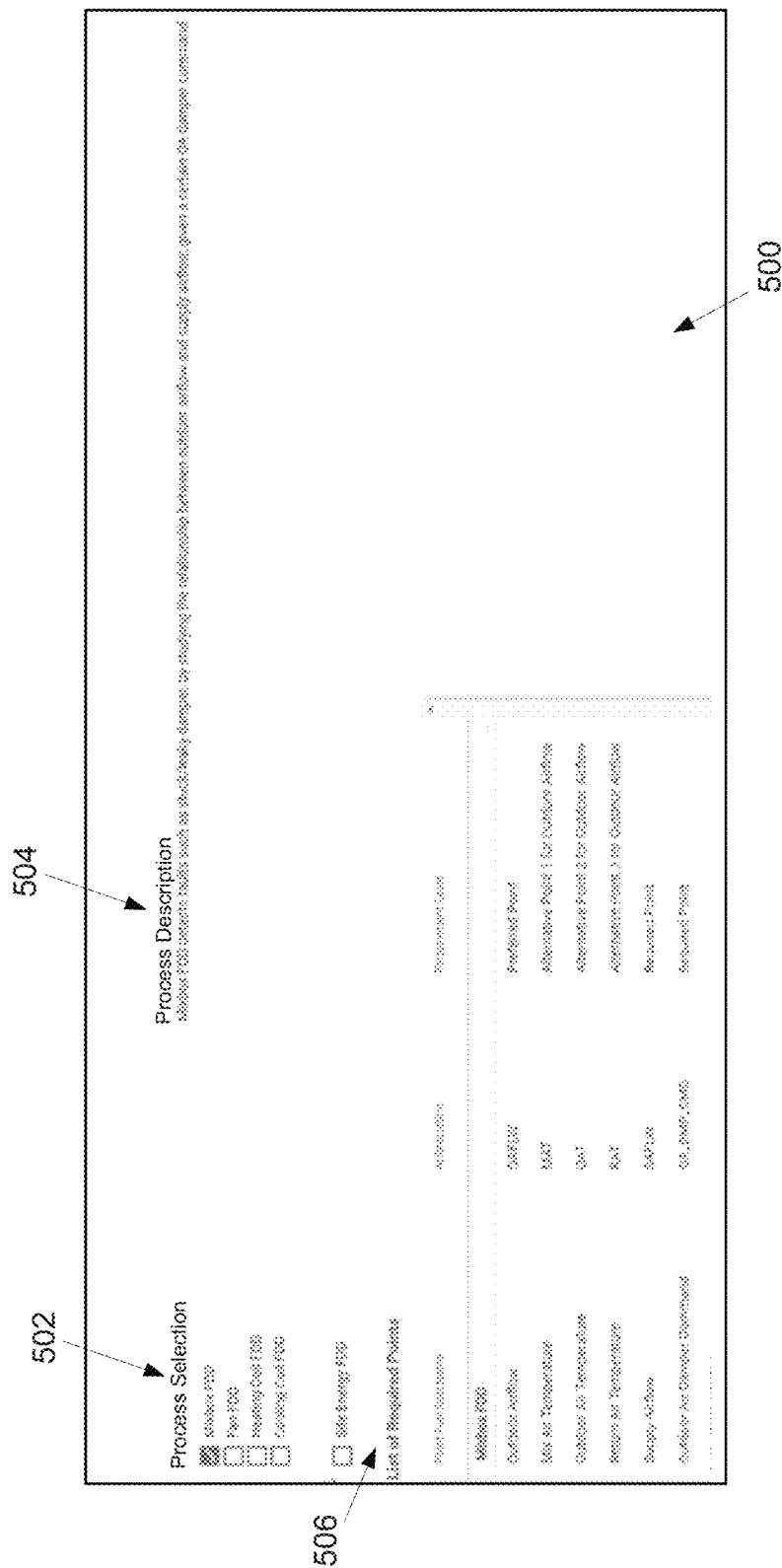
FIGS. 5 and 6 illustrate examples of graphical user interfaces in accordance with disclose embodiments.

FIG. 5 illustrates an example of a graphical user interface 500 in accordance with disclose embodiments, for selecting the process to be performed as disclosed herein. In this example, GUI 500 includes a process selection area 502, where a user can select the FDD process to be performed. GUI 500 includes a process description area 504, where the system displays a description of the selected FDD process. GUI 500 includes a list of required points 506, where the system displays the required, preferred, alternate, or optional points for the selected FDD process.

Of course, those of skill in the art will recognize that the GUIs described or illustrated herein are for example purposes only and are non-limiting.

Figure 6:
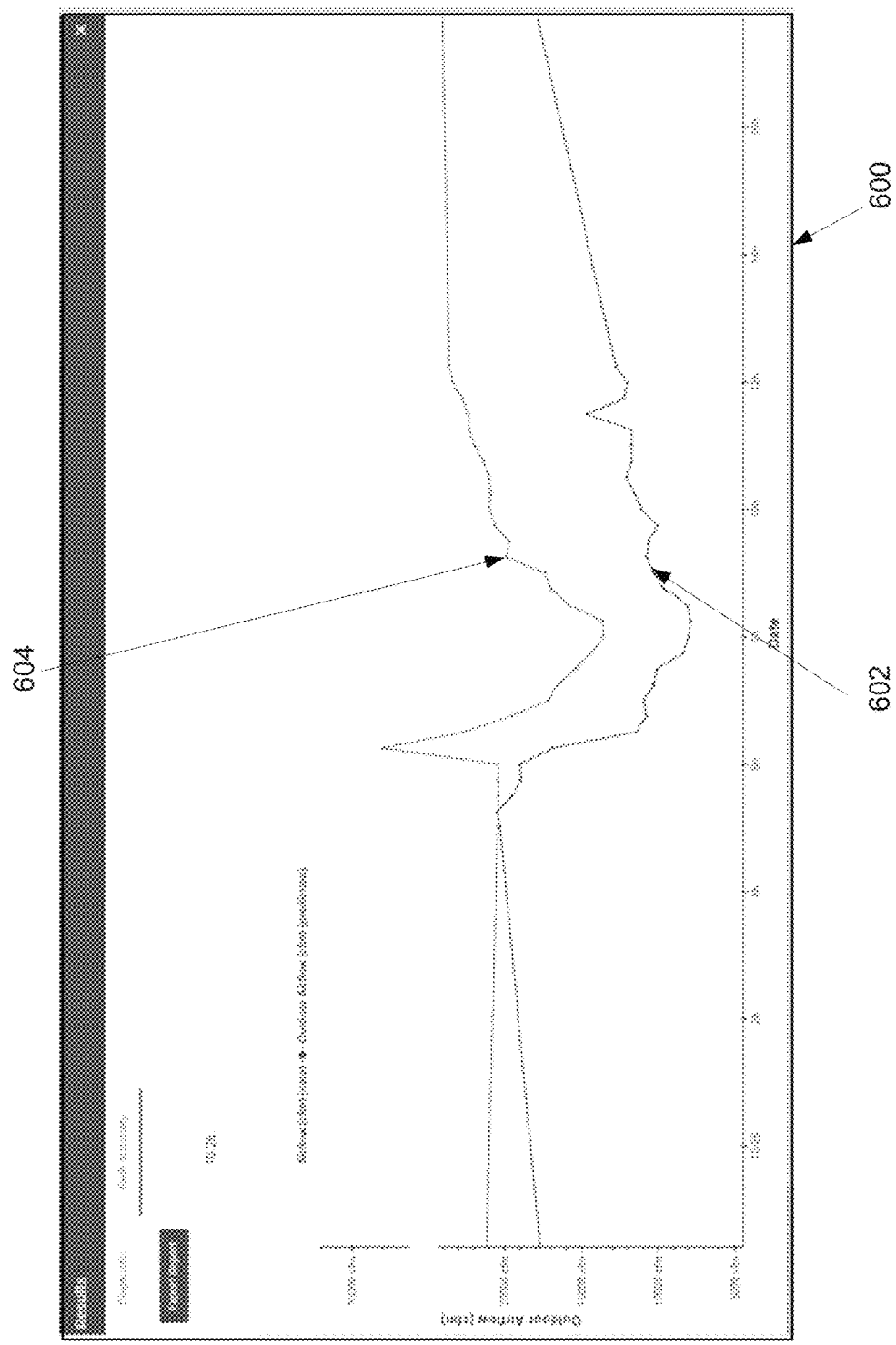

FIG. 6 illustrates an example of a graphical user interface 600 in accordance with disclose embodiments, as a fault report as disclosed herein. In this example, for a mixing box FDD, a fault summary is shown with the actual received/measured point data in the lower line 602 as compared to the deep learning model predicted data in the upper line 604, where this particular chart example represents the outdoor airflow over a span of hours on a given date. The specific timeframe represents the first period of time, for the received/measured point data, and the corresponding second period of time, for the deep learning model predicted data.

Disclosed embodiments improve the functionality and operation of the management system as disclosed herein. Improvements over rule-based system include more scalable and adaptable analysis over time with changes in building operation, a greater ability to catch early faults or degradation faults, and more actionable fault diagnostic information down to sub-system level. Some technical features that contribute to this are the application of state-of-the-art "deep learning" libraries and GPU computing for performance.

Those skilled in the art will recognize that, for simplicity and clarity, the full structure and operation of all data processing systems suitable for use with the present disclosure are not being depicted or described herein. Instead, only so much of a management system as is unique to the present disclosure or necessary for an understanding of the present disclosure is depicted and described. The remainder of the construction and operation of management system 100 may conform to any of the various current implementations and practices known in the art.

Moreover, none of the various features or processes described herein should be considered essential to any or all embodiments, except as described below. Various features may be omitted or duplicated in various embodiments. Various processes described above may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method for fault detection of a building automation system using deep learning comprising the steps of:
    maintaining a system manager application in a data processing system of a management system configured to perform building automation system functions and to provide a graphical user interface; and
    running the system manager application to:
        receive point data for a hardware being analyzed, wherein the received point data is contaminated data;
        train a deep learning model for the hardware being analyzed based on the received point data, without supplemental information, by applying a loss function;
        generate predicted data based on the deep learning model;
        normalize some or all of the predicted data or the received point data;
        analyze the predicted data and the received point data by applying cumulative sum control chart (CUSUM) sequential analysis for summing, weighting, and change detection;
        identify a fault in the hardware being analyzed according to the received point data and the predicted data; and
        produce a fault report according to the identified fault.

2. The method of claim 1, wherein the received data includes at least required points for the hardware being analyzed.

3. The method of claim 1, wherein training the deep learning model by applying the loss function includes applying a Huber loss function.

4. The method of claim 1, wherein training the deep learning model includes applying dropout techniques for regularization.

5. The method of claim 1, wherein identifying the fault includes comparing the received point data for a first period of time with the predicted data for a corresponding second period of time.

6. The method of claim 1, wherein identifying the fault includes identifying when a normalized deviation between received point data and the predicted data is greater than a predetermined threshold.

7. The method of claim 1, wherein the fault report is a graphic user interface illustrating the received point data as compared to the predicted data.

8. A non-transitory computer-readable medium encoded with executable instructions that is configured to run in a data processing system of a management system, configured to perform building automation system functions, and configured to provide a graphical user interface, wherein the building automation system functions include:
    receiving point data for a hardware being analyzed, wherein the received point data is contaminated data;
    training a deep learning model for the hardware being analyzed based on the received point data, without supplemental information, by applying a loss function;
    generating predicted data based on the deep learning model;
    normalizing some or all of the predicted data or the received data;

analyzing the predicted data and the received point data by applying cumulative sum control chart (CUSUM) sequential analysis for summing, weighting, and change detection;

identifying a fault in the received point data with respect to the predicted data; and producing a fault report according to the identified fault.

9. The non-transitory computer-readable medium of claim 8, wherein the received data includes at least required points for the hardware being analyzed.

10. The non-transitory computer-readable medium of claim 8, wherein training the deep learning model by applying the loss function includes applying a Huber loss function.

11. The non-transitory computer-readable medium of claim 8, wherein training the deep learning model includes applying dropout techniques for regularization.

12. The non-transitory computer-readable medium of claim 8, wherein identifying the fault includes comparing the received point data for a first period of time with the predicted data for a corresponding second period of time.

13. The non-transitory computer-readable medium of claim 8, wherein identifying the fault includes identifying when a normalized deviation between received point data and the predicted data is greater than a predetermined threshold.

14. The non-transitory computer-readable medium of claim 8, wherein the fault report is a graphic user interface illustrating the received point data as compared to the predicted data.

15. A building automation system comprising a data processing system, and a plurality of devices, sensors, and actuators, wherein the data processing system includes a graphical user interface and executes a system manager application to perform building automation system functions and to:

receive point data for a hardware being analyzed, wherein the received point data is contaminated data;

train a deep learning model for the hardware being analyzed based on the received point data, without supplemental information, by applying a loss function;

generate predicted data based on the deep learning model;

normalize some or all of the predicted data or the received point data;

analyze the predicted data and the received point data by applying cumulative sum control chart (CUSUM) sequential analysis for summing, weighting, and change detection;

identify a fault in the hardware being analyzed according to the received point data and the predicted data; and produce a fault report according to the identified fault.

16. The building automation system of claim 15, wherein training the deep learning model by applying the loss function includes applying a Huber loss function and dropout techniques for regularization.

* * * * *